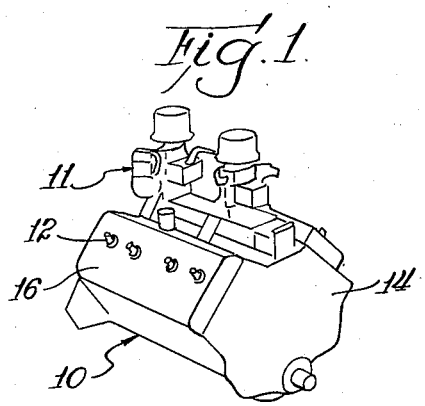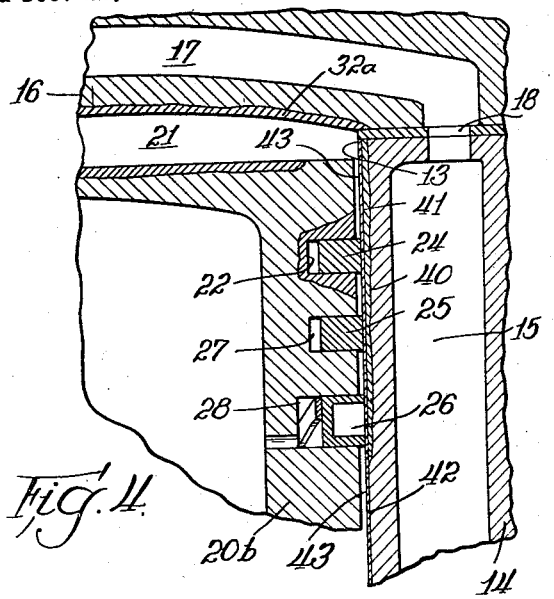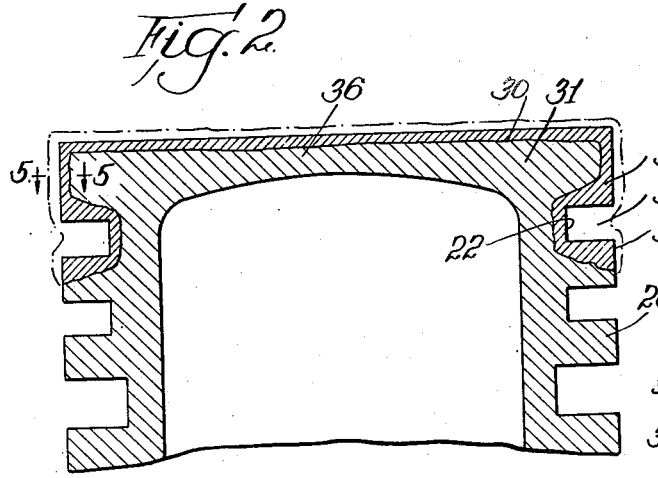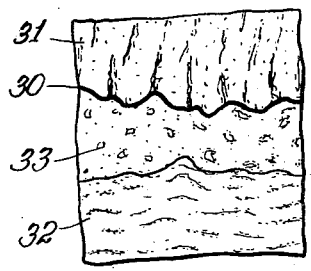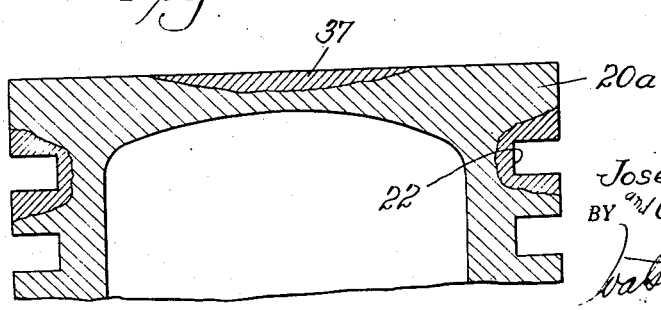

2,833,264

INTERNAL COMBUSTION ENGINE

Joseph J. Dailey, East Peoria, and Carl G. A. Rosen, Peoria, Ill., assignors, by mesne assignments, to John Altorfer, Peoria, Ill.

Application December 22, 1954, Serial No. 477,006

16 Claims. (Cl. 123—191)

The present invention relates to internal combustion engines, and more particularly to combustion chambers and pistons, and their structure and function in internal combustion engines.

Some of the important objects of the present invention are to provide a piston construction which lowers the heat transmitted to the cylinder wall and to the cooling jacket of an internal combustion engine and utilizes a greater amount of heat thus saved in the combustion and expansion of gases for power; maintains a higher mean cyclic temperature of the gas, yet lowers the average temperature of the aluminum piston with accompanying increase in effective horsepower; reduces heat distortion in the aluminum body of the piston; and, sustains fractionation temperatures which eliminate the formation of benzipyadrene and other unhealthy and deleterious substances in the exhaust gases which otherwise occur during deceleration an internal combustion engine.

Further object of the invention is to provide an improved piston and combustion chamber structure which receives and maintains a high polish upon their exposed surfaces to increase the resulting effective compression ratios and horsepower and to reduce preignition "pinging" under slight vacuum intake manifold pressures.

Other objects include piston and combustion chamber constructions contributing to more complete combustion efficiency; conservation of heat in the combustion chamber for faster combustion and greater power; less overall piston head expansion, yet higher combustion temperatures; closer tolerances with cylinder walls; an improved pressure-time curve relationship particularly with a slow-burning fuel gas; a substantially higher effective compression ratio than that at which the engine would otherwise be rated conventionally and above 12 to 1 with improved vaporization and homogenization of the fuel-air mixture; better lubrication of the cylinder side walls at lower temperatures; and pistons which can be lightened by materially reducing aluminum stock otherwise conventionally necessary for strength or heat conduction.

These being among the objects of the invention, other and further objects will become apparent from the description and the drawings herein, in which:

Fig. 1 is a perspective view of an internal combustion engine embodying the invention;

Fig. 2 is an enlarged section taken diametrically through the axial center of a piston embodying a preferred form of the invention as used in the engine shown in Fig. 1;

Fig. 3 is a view similar to Fig. 2 showing another embodiment of the invention;

Fig. 4 is a partial view similar to Fig. 2 showing another embodiment of the invention; and Fig. 5 is a microphotograph showing the respective layers of metal present along line 5—5 of Fig. 2.

The present invention contemplates the molecular bonding of molybdenum to aluminum and of stainless steel to the molybdenum with or without an interface metal of ferrous aluminate as described in application Ser. No. 435,696, reference to which is hereby made. The steel thus bonded to the piston preferably covers inclusively the compression ring groove and the entire head above the compression ring with a layer of highly polished stainless steel approximately $\frac{1}{16}''$ thick, preferably thinner to eliminate weight. This thickness is suggested since more metal than that is unnecessary, and although less thickness is desirable, such thickness would be a balance between strength and weight considerations having in mind also the amount of aluminum stock desired. Less thickness can be attained, if the metal is uniformly applied so that polishing does not encounter "thin" areas such as might occur with recessed or contoured piston heads.

The internal combustion engine shown at 10 is exemplary of gasoline, propane and diesel engines of the internal combustion type. However, this invention also contemplates the lining of combustion chambers for jet and other forms of fuel burning engines for the purposes of decreasing heat dissipation to the cooling jackets and increasing the heat effective for the better homogenization of the fuel, higher effective compression, and higher effective or working pressures following ignition. As shown, the engine includes a fuel dispensing means 11 and ignition means 12 for each combustion chamber.

The cylinder defined by the wall 13 is cast and machined in the block 14 to include a water cooled jacket 15. It is closed at its outer end by a head 16 also having a water cooled jacket 17 therein disposed in communication with the cylinder jacket through an interconnecting opening 18. The water or other coolant absorbs heat from the walls defining the combustion chamber and dissipates it in any suitable manner by being circulated through a radiator (not shown). Although the metal forming the cylinder wall may be cast iron or a steel sleeve, it is preferred that the wall and the head 16 be of aluminum whose exposed surfaces are processed and finished as hereafter described.

Reciprocably mounted in the cylinder is a piston 20, 20a, or 20b in a conventional manner for the transmission of energy for either 2 or 4 cycle engine operation in which a fuel-air mixture is compressed in the compression chamber 21 above the head 16 on the compression stroke of the piston and burned to develop power for the power or expansion stroke of the piston. The pressure developed is converted to horsepower by downward displacement of the piston and heat developed by burning the fuel is retained in a large part and employed in recurring cycles to develop higher horsepower and greater efficiency.

The piston is circumferentially grooved as at 22 to receive a compression ring 24 therein. Other rings, 25 and 26, are mounted in suitable grooves 27 and 28 to supplement the compression ring and also to control the amount of lubricant left upon the walls of the cylinder on the downward strokes of the piston.

Preferably the pistons shown embodying the invention are made of aluminum or aluminum alloy and in order to better understand the invention, it should be noted that with conventional aluminum pistons, as mentioned in the application referred to, the aluminum stock tends to soften enough under the intense heat to which the piston is subjected, and, with the friction between the ring and the cylinder wall that resists reciprocating movement of the compression ring, plus the inertia of the ring itself resisting reversal of its direction of movement under rapid reciprocation of the piston, the harder metal of the piston ring "hammers" against the softened aluminum stock forming the sides of its groove and enlarges the groove. This hammering is further augmented by the gas pressure dynamics acting on the under side of the top ring with a force superior to inertia forces present which causes a ring flutter each expansion stroke. The hammering condition becomes worse and worse as the groove becomes wider and wider. The higher the compression ratio, the higher the heat and the more rapid the ring groove deterioration.

In the present invention a piston construction is provided whereby a ring receiving portion of relatively harder material is incorporated in a light weight piston body in an improved manner to permit higher heat and higher compression without ring groove deterioration.

The following abridged table of properties of metals will be helpful in understanding the invention:

| | Melting Point, °C. | Boiling Point, °C. | Latent Heat of Vaporization, Cal. gr. |
|---|---|---|---|
| Molybdenum | 2,620 | 4,803 | 177 |
| Aluminum | 657 | 2,056 | 1,950 |
| Titanium | 1,800 | 5,100 | 1,320 |

A thin layer of metal or alloy preferably having a melting point above the boiling point of aluminum, such as molybdenum 30, is sprayed on the aluminum 31 over the surface of an oversized groove where the support of the compression ring 24 is to be carried. The oxidized surface of the aluminum struck by the molten molybdenum is vaporized thereby, the molybdenum molecularly bonds itself to the clean aluminum, solidifies and the displaced oxidized aluminum condenses on the outer surface of the molybdenum. Thereafter stainless steel 32 is sprayed to the desired depth over the molybdenum. The condensed oxidized aluminum combines with the steel to the extent that it is present to form a layer of ferrous aluminate 38 and the remainder of the steel remains pure. An over-supply of steel is applied as at 34 and then turned down to the surface line 35 of the piston. Then the ring groove 22 is cut. Closer tolerances are possible between the ring and groove to reduce "cocking" of the ring under combustion chamber pressures.

The temperature of the piston before and during spraying is preferably brought to and held at its normal working temperature which is in the neighborhood of 450° F.

As used herein, the terms "molecular bonding," "intimately bonded" or "spray bonded" mean the joining of two metals in contact with each other during a time when the metal receiving the spray is rendered molten thereby and the metals become intimately bonded by an intermixture of molecules at the interface including particles of unoxidized metal of the higher melting point being interlocked or embedded in surface to surface contact with unoxidized surfaces of the other or lightweight metal at the interface by solidification of the other metal against and subsequent to solidification of said particles as also set out more particularly in said application Serial No. 435,696.

It has been discovered that if the molybdenum and stainless steel layers are extended to cover the head 36 of the piston as shown in the preferred embodiment in Fig. 2, it serves as a hard shell which does not shrink or expand as much as the aluminum body so that closer clearances with the cylinder can also be maintained, yet there will be no separation of metals throughout the life of the piston.

Not only this, but it was found that a layer 32a of stainless steel similarly bonded upon the cylinder head 16 as shown in Fig. 4, further lowered the heat carried into the jacket and maintained a higher mean cyclic temperature of the gas, that the surface of the cylinder head remained much hotter, less heat was conducted to the head cooling jacket, the engine parts ran cooler and power was substantially increased. It appeared that a better and a more thorough combustion occurred thereby accomplishing fuel economies.

Polishing off the stainless steel surfaces also increased the power output. Less liquid fuel had to be used to assure sufficient vaporization to fully utilize the air present in the intake because the higher heat in the walls of the chamber quickly supplied by contact and radiation more than adequate latent heat of vaporization under the cyclonic movement of the mixture over the hot walls when drawn in and compressed.

It was also discovered that the exhaust gases were more uniform in their chemical content throughout acceleration and deceleration of the engine and examination revealed that the formation of benzipyadrene was eliminated, which is a chemical very harmful to the lungs and skin of mammals. This occurred because the extra heat carried by the stainless steel layer provided adequate heat during deceleration that a constant or safe fractionation of the fuel was maintained.

By way of further explanation, as $C_2H_4$ is chemically changed to $CO_2$ and $H_2O$ in the explosion or combustion cycle, the temperature necessary to sustain this reaction is maintained because the combustion chamber is not permitted to chill to a point where benzipyadrene or aldehydes and CO and $H_2O$ are formed.

For a better understanding of these results, it is interesting to note that an internal combustion engine involves a situation where during the compression stroke the terminal temperature at the end of compression is influenced by the temperature of the surrounding combustion chamber envelope. This temperature becomes effective in four cycle engines after the cylinder is charged on the intake stroke. The higher this temperature, the higher the terminal compression temperature, which, with increased molecular activity at higher temperatures, is equivalent to carrying the resulting compression to a theoretically higher compression rate. Whether the engine is four cycle or two-cycle in its operation, the fuel which is present or introduced at the terminal point of compression is shortly thereafter ignited. Thereupon the combustion period follows a procedure where the higher temperature and the higher compression play an important part, the higher temperature performing a part not possible merely with increasing the combustion ratio. The influence of the temperature of the combustion chamber envelope and the higher terminal compression temperature provides an atmosphere in which combustion can proceed more rapidly than normally irrespective of compression alone, although intimately cooperating therewith. In proceeding more rapidly than normal, a greater amount of heat is liberated near the top stroke of the piston where the surface walls have the minimum area of exposure and there is lower loss of heat transferred thereby through the small area into the jacket water space. The rapidity of combustion permits expansion to take place as the piston proceeds down the stroke and terminates the combustion period much nearer top center than would normally be the case where lower envelope temperatures prevailed during the early compression stroke. By this rapidity of combustion and the liberation of heat nearer top center, the pressure exerted on the piston during the early part of the expansion stroke provides greater energy to the mechanical system through the piston by virtue of the burning and expanding gases.

By this more efficient method of combustion, expansion takes place rapidly and terminates at the point of opening of exhaust valve at reasonably low pressures, or at lower pressures than would normally take place had the combustion chamber envelope been initially cooler.

The energy rejected through the exhaust gases is, therefore, not increased but is, in fact, actually diminished over that of the conventional requirements for power. The rapidity of combustion during the early part of the expansion stroke reduces the heat rejected to the jacket water and therefore the sum total of heat losses is lowered, and when subtracted from the heat introduced through the fuel, there is a higher efficiency resulting. Furthermore, the combustion chamber, when surfaced with a bright, heat resistant metal providing low heat transference to the cylinder head and to the piston, the bright surfaces of the combustion chamber envelope reflect the radiant energy to concentrate the heat upon the gases within the zone of combustion thus increasing the rapidity of combustion within the combustion chamber envelope away from the walls which surround the combustion chamber envelope.

Thus it will be seen that a further advantage is present. An increase in effective energy is attained without increasing the heat input. In fact, once the motor is warmed up, the heat output of it, as far as rejected heat to the cooling jacket is concerned, is lowered and the effective heat, for purposes of increased energy, is raised.

Varying degrees of these advantages can be accomplished with variation in the area covered by stainless steel. In Fig. 3, a heavy layer 37 is bonded as already described over a limited area as shown in Fig. 3, preferably where it forms one of the walls proximate to the volumetric center of the compression chamber. The embodiment in Fig. 4 shows the layer extending over a larger area of the head as where the compression space is comparatively shallow. In any event, the same advantages exist in varying degree, it being preferred not to have any less than that shown in Fig. 3 to maintain the fractionation temperature that eliminates benzipyadrene on the deceleration of the engine, as where the momentum of a moving load such as a motor vehicle is overrunning the engine.

Moreover, it was found to be highly desirable to recess the top portion of the cylindrical wall as at 40 (Fig. 4) and bond a layer 41 of stainless steel thereto, also as already described, dress it down to the size of the cylinder at 42 and then chrome plate the cylinder throughout its length as at 43. This band of stainless steel provides a low expansion band at the critical area in the cylinder where most wear is likely to occur. Thereby, not only is the horse power, efficiency and cooling of an engine increased, but also its life. Moreover, under heavier loads the efficiency goes up. It will also be noted that contact by the piston with the lower portion of the cylinder still permits rapid heat transfer from the piston to the water jacket because the heat conductivity of the aluminum body 26 more than makes up for any retardation at the chrome plating layer.

It has been found that stainless steel thus bonded on the piston head as well as where it forms the walls of the compression ring, the cylinder head and cylinder, does not come loose and does not fracture. Moreover it is not corroded by the gases and the wider extremes of temperature to which the piston is subjected to accomplish the advantages described. They have no deleterious effect upon the piston. Moreover, the lubrication is better because it is effectively accomplished at lower temperatures and the pistons and head remain clean with little, if any, formation of carbon deposits on them.

Other metals also could serve as the intermediate material if their boiling point is high enough that aluminum is vaporized preferably without the metal reaching its own boiling point. Cobalt and nickel could be used in this connection under carefully controlled temperature conditions, the calories per gram ratio between the metals being important. There should be enough calories present in the applied metal below its boiling point to cause some vaporization of the aluminum at its surface.

We have found, however, that molybdenum gives the best results because some leeway is permitted in the distance between the nozzle of the metal spray gun and the work in order to control with predictability the vaporization and the resulting Brinell of the metal. For the filling metal a 3½" spacing gives the best degree of hardness which should be within the range of Rockwell C 23 to 26 for grinding, groove cutting or finishing operations.

Having thus described the several embodiments of the invention, it will be apparent to those skilled in internal combustion engines how the objects of the invention are accomplished and how various and further modifications can be made without departing from the spirit of the invention, the scope of which is commensurate with the appended claims.

What is claimed is:

1. For use with an internal combustion engine, a lightweight piston having a head and skirt, integral disk and annular portions mounted on the head and skirt of a material which is relatively harder than that of the piston skirt, said integral portions being intimately bonded to the material of the head and skirt by laminated layers of particles of a metal whose melting point is above the boiling point of the material of said head and skirt and said particles are in unoxidized metal to metal contact with the metal of the head and skirt at the interface therebetween.

2. In an internal combustion engine, the combination of an aluminum piston having a head covered with a layer of stainless steel bonded thereto by an intermediate laminated layer of particles of metal whose melting point is above the boiling point of the aluminum, the particles of said layer proximate to the aluminum piston being unoxidized and intimately bonded to unoxidized aluminum by an intermixture of the molecules at the interface, and a cylinder head covered with a layer of stainless steel defining a combustion chamber.

3. In an internal combustion engine, the combination of an aluminum piston having a head with the central portion thereof covered with a layer of ferrous metal molecularly bonded thereto by an intermediate layer of particles of metal embedded in intimate contact with unoxidized metal of the piston, and a cylinder head having an inner surface of ferrous metal defining a combustion chamber.

4. In an internal combustion engine, the combination of a cylinder head having a wall defining a combustion chamber which comprises a material of low heat conductivity, a thin piston of a material having high heat conductivity, a disk element mounted on the head of the piston of a material which has low heat conductivity, said disk being intimately bonded to unoxidized material of said head by an intermediate layer of particles of metal whose melting point is above the boiling point of the piston at an interface which comprises unoxidized particles of the intermediate layer intimately contacting surface to surface with unoxidized material of the head in good heat exchange relationship.

5. In an internal combustion engine, the combination of an aluminum piston having a head covered with a thin layer of stainless steel, said head being provided with a compression ring, a cylinder head covered with a layer of ferrous metal defining a combustion chamber, and a cylinder wall with a portion thereof covered with stainless steel, said portion being of extent sufficient to be traversed by said ring as the piston reciprocates, said layers of stainless steel being bonded to said head and wall by an intermediate layer of laminated particles of metal taken from the group consisting of molybdenum, titanium, cobalt and nickel molecularly bonded to unoxidized material of said head and wall at the interface in intimate heat exchange surface to surface contact.

6. In an internal combustion engine, a combustion chamber defined by walls of metal containing aluminum, a covering for said walls comprising a thin layer of laminated particles of metal taken from the group consisting of molybdenum, titanium, cobalt and nickel in intimate contact with unoxidized aluminum at the interface of said layer and aluminum.

7. In an internal combustion engine, a combustion chamber defined in part by a wall of metal containing aluminum, a covering for said wall comprising a laminated layer of particles of molybdenum intimately bonded to unoxidized aluminum at the interface and a layer of stainless steel supported in bonded relationship to said molybdenum by an intermediate layer of ferrous aluminate.

8. For use with an internal combustion engine, a piston having a head of a material having high heat conductivity, a disk element on said head of a material which has low heat conductivity, said disk being intimately bonded to unoxidized surfaces of the material of said head by laminated layers of particles of metal taken from the group consisting of molybdenum, titanium, cobalt and nickel.

9. A piston having a body made of a metal containing aluminum for use in an internal combustion engine, the area of said piston exposed to contact with the products of combustion being covered with molybdenum intimately bonded at the interface to unoxidized aluminum in said metal of the body by laminated layers of particles of molybdenum in intimate heat exchange metal to metal contact with said unoxidized aluminum.

10. For use with an internal combustion engine, a lightweight piston having a head and skirt, an annular portion mounted at the juncture of the head and skirt of a material which is relatively harder than that of the piston skirt, said annular portion being intimately bonded to unoxidized material of the head and skirt by laminated layers of particles of metal whose melting point is above the boiling point of the material of said head and skirt with the particles at the interface in intimate heat exchange metal to metal contact with said unoxidized material.

11. For use with an internal combustion engine, a lightweight piston having a head and skirt, a disk mounted on the head of a material which is relatively harder than that of the piston skirt, and disk being intimately bonded to an unoxidized surface of the material of the head and skirt by a layer of laminated particles of metal whose melting point is above the boiling point of the material of said head and skirt with said particles at the interface in intimate contact with said unoxidized surface.

12. For use in an internal combustion engine, a piston having a body made of a metal containing aluminum, a coating of laminated metal particles bonded in unoxidized metal to metal contact with and covering a portion of the head thereof taken from the group consisting of molybdenum, titanium, cobalt and nickel, and a second coating bonded to the metal including a layer of laminated particles of stainless steel.

13. For use in an internal combustion engine, a piston having a body made of a metal containing aluminum, a coating of molybedenum particles molecularly intermixed at the interface in intimate contact with unoxidized aluminum of the head, and a second coating bonded to the molybdenum including a layer of stainless steel.

14. A cylinder head having a body made of a metal containing aluminum for use in an internal combustion engine, the area of said head exposed to contact with the products of combustion being covered with a material of low heat conductivity intimately bonded to said metal of the body by an intermediate layer of laminated particles of metal taken from the group consisting of molybdenum, titanium, cobalt and nickel in intimate contact with unoxidized aluminum.

15. For use in an internal combustion engine, a cylinder having a body made of a metal containing aluminum, a coating of laminated particles of molybdenum intimately bonded to unoxidized aluminum at the interface over a portion of said cylinder body defining a combustion chamber, a second coating bonded to the molybdenum including a thin layer of sprayed molten ferrous material and a third coating of chrome plate throughout the length of the cylinder.

16. For use in combination with an aluminum piston having a surface on its head of ferrous metal of low heat conductivity, a cylinder of high heat conductive aluminum alloy having a band of laminated particles of metal of low heat conductivity at its upper end in intimate contact with unoxidized aluminum, said metal band being chrome plated throughout its length.

References Cited in the file of this patent

UNITED STATES PATENTS

| | | |
|---|---|---|
| 1,792,057 | Aske | Feb. 10, 1931 |
| 2,101,045 | Blettner | Dec. 7, 1937 |
| 2,162,789 | Raub | June 20, 1939 |
| 2,445,457 | Whitfield et al. | Dec. 7, 1948 |
| 2,573,116 | Stuckert | Oct. 30, 1951 |
| 2,588,422 | Shepard | Mar. 11, 1952 |
| 2,693,789 | Lechtenberg | Nov. 9, 1954 |

FOREIGN PATENTS

| | | |
|---|---|---|
| 454,809 | Germany | Jan. 19, 1928 |
| 695,708 | Germany | Aug. 31, 1940 |

OTHER REFERENCES

Van der Horst: Metal Finishing Magazine, February 1942, pp. 69–73.